United States Patent [19]

Horner et al.

[11] Patent Number: 5,244,579

[45] Date of Patent: Sep. 14, 1993

[54] TRANSPORTABLE REVERSE OSMOSIS WATER PURIFICATION UNIT

[75] Inventors: Kenneth J. Horner, Burlington; Douglas R. Whiting, Hamilton, both of Canada

[73] Assignee: Zenon Environmental Inc., Burlington, Canada

[21] Appl. No.: 958,086

[22] Filed: Oct. 9, 1992

[51] Int. Cl.$^5$ .............................................. B01D 61/00
[52] U.S. Cl. .................. 210/652; 210/195.2; 210/257.2; 210/636; 210/791
[58] Field of Search .................. 210/652, 195.2, 257.2, 210/636, 791, 282, 264, 333.1, 333.01, 275

[56] References Cited

U.S. PATENT DOCUMENTS

| | | | |
|---|---|---|---|
| 4,414,113 | 11/1983 | LaTerra | 210/636 |
| 4,574,049 | 3/1986 | Pittner | 210/195.2 |
| 4,681,677 | 7/1987 | Kuh et al. | 210/282 |
| 4,784,771 | 11/1988 | Wathen et al. | 210/636 |
| 4,810,388 | 3/1989 | Trasen | 210/257.2 |
| 4,980,066 | 12/1990 | Slegers | 210/321.69 |
| 5,043,071 | 8/1991 | Anselme et al. | 210/791 |
| 5,116,500 | 5/1992 | Ceaton | 210/282 |

FOREIGN PATENT DOCUMENTS 2830987 1/1980 Netherlands ..................... 210/257.2

OTHER PUBLICATIONS

"Operation Desert Storm"-Army's Use of Water Purification Equipment-Sep. 1991 U.S. Gen. Acctg. Office Report to the Chairman, Subcommittee on Readiness, etc.
"Reverse Osmosis" Development of a High Technology Water Treatment Capability for the Canadian Forces-by Capt. M. J. Hauschild, UBIQUE No. 35, Sep. 1990.
"The Army Water Supply Program" by Thomas H. Bagwell, Jr.-U.S. Army Belvoir Research and Development and Engineering Center-Sep. 1990.
Information on Filtomat Water Filters Focus on Fluid Handling by Ed Rothenberg Jun. 1988.

Primary Examiner—Robert A. Dawson
Assistant Examiner—Ana M. Fortuna
Attorney, Agent, or Firm—Alfred D. Lobo

[57] ABSTRACT

A self-contained, transportable reverse osmosis water purification unit has a limited throughput of no more than about 20 gpm of permeate in a single pass operation with reverse osmosis ("RO") modules which can be cleaned in place. When raw water is particularly fouled, the unit is operated in a double pass operation in which the permeate from the first pass is used as feed for a second RO module. The unit, referred to as a "purification container" "PC" or an ADROWPU because the PC is air-deliverable, comprises an enclosed weathertight housing having a base on which the major components are removably mounted. For transportability, the PC has the overall dimensions of an ISO container, and is fitted with means to load and unload it on standard carriers. A high pressure pump is required to feed water freed from suspended solids to the RO modules. The pump also delivers concentrate to a bladder tank where the concentrate is stored under pressure (about 100 psig) to flush a coarse filter automatically when it is plugged, which is often. Fine filters for solids removal are not plugged too often and can be replaced when the unit is not producing permeate. The ADROWPU is unique because of the economy of components used to produce a relatively large amount of permeate from any available raw water source. The placement of the components symmetrically about the center of mass of the PC is essential to allow the PC to be loaded and unloaded uneventfully, even if it is delivered by a helicopter.

8 Claims, 8 Drawing Sheets

TRANSPORTABLE REVERSE OSMOSIS WATER PURIFICATION UNIT

BACKGROUND OF THE INVENTION

This invention relates to an easily transportable unit comprising a container having a base adapted to be picked up and loaded onto or into transport means for transporting the unit, as well as adapted to be unloaded from the transport means, without a requirement of due care. The container is packed with equipment which provides pure water as "permeate" from reverse osmosis ("RO") modules which separate potable water from contaminated water unfit for human use. The specific requirement of the unit is that the RO modules deliver permeate in a relatively small volume/unit time, irrespective of how isolated the environment in which only contaminated fresh water, brackish water, or sea water is to be found.

As will presently be evident, the maximum dimensions and weight of the unit is specified, as is the wide range of conditions under which it must operate successfully. The problem is to use major components which are readily available and to pack them into the specified dimensions without sacrificing reliability of the unit.

RO modules in various systems are routinely used to produce high purity water by pumping source water at a pressure above the osmotic pressure of the dissolved substances in the water, through a semipermeable membrane. Permeate passes through the membrane but the contaminants remain in a "concentrate" stream which is discharged. Even to produce only 20 gpm of permeate from contaminated water, requires feeding the contaminated water at such high pressure that the mass and weight of the modules housing RO elements with adequate surface area and associated equipment is unexpectedly high. If the ROWPU is to be self-contained it must also carry its own tanks for back-flushing (or "back-washing"—the terms are used synonymously) filters and for chemical cleaning solution to clean the RO elements, along with a generator for generating electricity, and related equipment with associated instrumentation.

In addition to the RO modules and tanks, the equipment packed in the container, referred to as a "purification container" or "PC" for brevity, includes pumps and a combination of coarse and fine prefiltration means, on-board pressurized back-flushing means for a coarse screen filter, and appropriate valving and instrumentation. The modules are connected so that they may be operated in either a single pass or double pass mode, depending upon the quality of the water source, and the amount of the permeate desired.

More specifically, the RO equipment is specifically directed to fulfill the need of a military personnel unit which requires from about 10 gpm (gallons/minute) but no more than 20 gpm, typically about 15 gpm, of permeate produced in a totally self-contained PC which is demountably disposed on a truck for transportation, or even carried in an airplane or by a helicopter and air-delivered, so that the PC delivers potable water from whatever source of water which may be available at any location where the PC is delivered. Under conditions of conflict, or in the event of a major accident at a nuclear facility, when water may be contaminated with nuclear, biological and chemical ("NBC" for brevity) warfare agents the equipment is able to deliver potable water at reasonable cost.

Since in an isolated environment there is no available electrical power, it will be evident that the PC must provide its own, therefore includes a hydrocarbon fuel-powered (diesel fuel) generator. What is less evident is that the PC must be fully assembled and easily operable under difficult conditions, since it is unlikely that skilled personnel will be available to assemble and operate the equipment. In other words, the overriding consideration is that transportability of the PC must be as a single unit with all components preassembled and ready to operate with only rudimentary instructions to an operator.

The armed services were supplied with a reverse osmosis water purification unit described in an article titled "Reverse Osmosis Development of a High Technology Water Treatment Capability for the Canadian Forces" by Capt M. J. Hauschild in *UBIQUE* No. 35, pg 32-37, Sept '90. This unit was referred to as an ADROWPU (acronym for Air Deliverable Reverse Osmosis Water Purification Unit), because it was hoped it could be delivered by helicopter. The term "purification container" or PC is used herein substantially synonymously with the term ADROWPU. The components of the system schematically represented in the article, used two banks of RO modules arranged to operate in a double pass mode.

By "double pass mode" is meant that water to be filtered is flowed through two RO modules, in practice, two banks of modules, in two (first and second) passes. Permeate from the first pass (referred to as "first permeate") is flowed as feed to the second bank to be filtered in a second pass, so as to yield a second permeate different in quality from the first permeate. Thus, if the rejection in the first pass is 80% so that only 20% of the incoming water (to the first bank) is withdrawn as first permeate, this first permeate is then fed to the second bank and again filtered in the second pass. If the rejection in the second pass is the same as that in the first pass, namely 80%, then only 4% of the incoming water (to the first bank) is withdrawn as second permeate from the second pass.

Details of the ADROWPU referred to in the article are substantially as shown in FIG. 1 of the appended drawing. The raw water pump supplied water to a process pump. To remove suspended solids a combination of screen filters (20 mesh and smaller mesh), and cartridge microfilters (100 $\mu$m and 50 $\mu$m) were used. Other conventional removal of suspended solids, such as by adding coagulant, then flowing through multimedia filters and cartridge microfilters are also effective. This ensured that suspended solids are removed. A solids-free feedwater was fed to the banks of RO modules.

The last step during normal operation was to add calcium hypochlorite to disinfect the RO permeate so as to maintain a chlorine residual of 5 mg/L. If required, an NBC post treatment with granular activated carbon for chemical warfare agents, and, an ion exchange column for nuclear warfare agents is added to the overall package.

Though the aforementioned ADROWPU delivered the desired permeate at the desired flow rate, it was deemed inadequate for service because of at least two problems. First, operation was interrupted too frequently because the unit was shut down to replace the cartridge filter.

Other transportable RO module systems have been used by the armed forces. A particular example is described in an article titled "The Army Water Supply Program" by Thomas. Bagwell, Jr., U.S. Army Belvoir Research and Development and Engineering Center, September 1990. This unit was a 600 gal/hr reverse osmosis water purification unit (referred to as a "ROWPU" in the article) in which the components were arranged so that RO modules operating in a double pass mode, produced 10 gpm of permeate from 40 gpm (gals/min) raw water pumped through a multimedia filter. After filtration through the multi-media filters, the water passes through a housing consisting of forty 5 $\mu$m cartridge filters. The solids-free feedwater was fed to a bank of four pressure vessels in series, each vessel containing two 6" (inch) diameter RO membrane elements for a total of 8 elements. Production of permeate had to be interrupted to replace the multimedia filter and to replace the cartridge filters.

The package was mounted on a 5 ton trailer along with a 30 Kw (kilowatt) generator, and 3 open top collapsible fabric tanks able to hold 3000 gals. Two of the tanks are used to store potable water made, and one is used to collect water for back-washing of the filter media and cleaning of the RO elements with adequately high-pressure pumps. Two raw water pumps supply 30 gal/min to the ROWPU and distribution and back-wash pumps are used when required. Upon unloading the equipment at a chosen site, the components of the ROWPU had to be assembled before being placed in operation.

The foregoing unit was transportable with difficulty and was therefore limited for use where a very large wheeled vehicle can be driven, or a very large skid can be hauled. Most particularly, and critical to the invention herein, the many components of the armed forces system, and other prior art units, failed to recognize the importance of distributing the components within a housing in such a manner that the masses of the components were substantially symmetrically disposed relative to the center of mass of the container.

In common with the prior art ADROWPU, the ROWPU screen filters had to be cleaned manually after stopping operation of the unit to make RO permeate. In each case, a source of clean water was required to back-flush the screen filters. In each case, it was a serious drawback with respect to efficient production of RO permeate because permeate was saved to clean the filters.

The problem of back-flushing the screen filters and chemically cleaning the RO membranes "in place" within the RO vessels is particularly acute when water contaminated by NBC contaminants must be purified, since a source of clean water (such as "tap-water" in a city) is not available, and one can ill afford to use permeate for such a function. Moreover, the use of a back-flushing pump and yet another pump for chemically cleaning the RO membranes added to the size and weight of the equipment in the ROWPU.

The novel ADROWPU of this invention (still referred to as such because the new and improved unit is air-deliverable) avoids using a back-flushing pump and a separate chemical cleaning pump. Stored permeate is not used to back-flush the screen filters, as was done in the prior art. Further, the screen filters are back-flushed with concentrate from the RO modules which would have been, and is, discarded.

Most importantly, the screen filters are back-flushed automatically, without stopping production of permeate. This automatic back-flush is accomplished by a unique utilization of a commercially available self-cleaning Filtomat screen equipped with an automatic screen-cleaning means actuated upon being back-flushed. To work efficiently this device is designed to operate with an available supply of at least 110 gals/min at a pressure in excess of 30 psig (>30 psi) for from 3 to 5 secs.

Conventionally, several Filtomat screens are used in parallel in a system where the flow of available water is essentially unlimited. When one of the screens becomes fouled, it automatically requires a diversion of flow from the main feed line. This flow is readily supplied because there is no shortage of volume (in excess of 110 gpm is usually available) at above the required pressure.

In the rare instance where a single Filtomat unit is used, it is not critical to have continuous flow delivered to the system. Under such circumstances, if the feed pressure and flow to the Filtomat is not adequate, the outlet valve on the effluent of the device is automatically closed and not opened until the cleaning cycle is completed.

In an ADROWPU, since the effluent from the Filtomat is the feed to the process pump, it is critical to maintain the flow of 40 gpm and adequate pressure (15 psig) in the line.

If, as in a conventional situation, one was to provide 110 gpm for the Filtomat and still maintain a flow of 40 gpm to the ADROWPU unit, one would require a 150 gpm pump. It is mechanically impractical and unsound to constrain a 150 gpm pump solely to use it at its design throughput once every hour (say) for a duration of from 3 to 5 secs. It would be used at the design throughput even less frequently if the raw water to the unit is not too dirty.

Since the maximum flow in a transportable ADROWPU is 40 gpm, delivered by the feed pump, the conditions of water availability at a site where a ADROWPU unit would operate are far removed from those at a site where such a Filtomat self-cleaning device is conventionally used.

As will be described in greater detail hereafter, the Filtomat screen can only be used in the ADROWPU in combination with an adequately high pressure storage means capable of delivering at least 110 gpm for a short period of time. It is unexpectedly practical to store the concentrate for back-flushing only because, for back-flushing, this concentrate is to be delivered from the storage means (a bladder tank is used), for only from 3 to 5 seconds at a pressure sufficient to ensure cleaning the fouled screen. Thus, except for storing flushing water in a bladder tank under at least 95 psig pressure (so that at the end of the flushing cycle at least 35 psig remains) the Filtomat could not have been used in an ADROWPU.

Another improvement in the new ADROWPU is that no permeate is stored, to be made up into a chemical cleaning solution for fouled RO modules. A "clean-in-place" tank is carried in the ADROWPU, but this tank is empty (saving weight) except when the RO modules are being cleaned with permeate to which cleaning chemicals are added.

Most particularly, the PC of this invention is designed not to use outside sources of water for cleaning of any type, and, as stated hereabove, to position all the components of the PC in a housing so as to secure the relatively heavier components symmetrically about the center of mass of the PC. The method of operating the equipment in the PC, and the effectiveness of each of the combination of system elements in the package, address the inherent deficiencies of the prior art equipment.

Other deficiencies, such as those discovered during operation in adverse weather, whether frigid or hot, have also been overcome. For example, in sub-zero weather conditions, at ambient temperatures below −15° C., cold enough to freeze water in any of the individual items of equipment in the PC, the prior units used by the army did not function because the equipment was inadequately protected by insulation alone. In the novel PC, heated air, ducted over the hot fins of an air-cooled diesel generator (for the electrical power required to run the PC) provides an unexpectedly effective way of maintaining a desirable temperature within the PC. The heat from the diesel may be supplemented with a conventional heat source such as a 10 kW heater, which will come on automatically when the ambient temperature in the PC is below 5° C.

SUMMARY OF THE INVENTION

A novel and surprisingly effective, fully self-contained, easily transportable, reverse osmosis water purification container ("PC") capable of producing no more than about 20 gpm of potable permeate from as little as 40 gpm of brackish water, is constructed by integrating known items of equipment into an ISO (International Standards Organization) container, or equivalent small space, despite including a large, preferably 44 gallon, "bladder" tank and a large, preferably 40 gallon, "cleaning chemicals" tank, each of which tanks permits restoring the efficient operation of screen filters and RO membranes. The surprising effectiveness of the specific combination of individual items of equipment, and their distribution, mounted on shock-absorbing mounting means with the masses of the components and associated piping and controls, in separate first and second compartments, symmetrically about the center of mass of the container in which the components are housed, not only successfully overcomes the deficiencies of prior art units but also allows the PC to have overall dimensions of an ISO container (5.5 m long×2.1 m wide×1.7 m high) so that it can be pelletized for ruggedized handling, capable of withstanding a shock of 10 Gs.

It has been discovered that a combination of a relatively coarse screen automatically back-flushable filter having openings no greater than 300 μm, preferably 200 μm, and, a fine filter, preferably comprising a 50 μm screen filter disposed upstream of, and immediately prior to plural 5 μm-15 μm cartridge filters, effectively removes screen-plugging solids before they reach the cartridge filters; this avoids the use of coagulants and multi-media filters, and allows the use of disposable cartridge filters, so that only the coarse screen filter needs to be back-flushed automatically. This latter operation is accomplished by "pumpless back-flushing" with concentrate stored in a bladder tank, without manual intervention by the operator. The coarse screen filter is therefore termed a "self-cleaning" filter.

It has also been discovered that only three RO pressure vessels ("modules"), each equipped with only 2 spiral wound RO membranes, are necessary to provide a double-pass operation to purify brackish water and yield nearly 11 gpm of permeate, provided two first-pass and one second-pass RO modules are connected as follows: concentrate from one first pass module is fed to a second first pass module, and the permeate from both first pass modules is fed to a second pass pump; normally brackish water may be purified in a single pass yielding about 20 gpm of permeate with a 40 gpm brackish water supply; in double pass operation the yield of permeate is about 11 gpm; and, the PC is operable at ambient temperatures in the range from −40° C. to 40° C. In all instances, potable permeate meets the standard of NATO STANAG 2136 QSTAG 245.

It is therefore a general object of this invention to provide a combination of coarse and fine filtration means to remove suspended solids, an automatic self-cleaning means for a back-flushable coarse screen filter means, and, only spiral flow RO modules arranged for first and second pass operation, preferably only three RO modules. Two modules in a first bank are in series in a first pass mode, the concentrate from the first being used as feed to the second. A single module in the second pass is connected to have permeate from both modules in the first bank directly fed into the second pass process pump which feeds the permeate directly into the second pass module, eliminating any chance to introduce contaminants in the water.

It is a specific object of this invention to provide a water purification system to deliver no more than 20 gpm of RO water permeate, packaged in a PC in which only about 40 gals of cleaning solution is made up with permeate from either the first or second pass RO vessels in the PC. Conventional chemicals are used to make up a "cleaning solution" for the RO membranes. This cleaning solution is pumped through one pass of modules at a time using the booster pump (used to repressurize feed water into the system), thus avoiding the use of an additional cleaning pump.

It is another specific object of this invention to provide a PC which is not only easily ground-transportable but also air-transportable by virtue of the disposition of the components of the PC substantially symmetrically about the vertical planes intersecting at the physical center of a rectangular box-like container, and also substantially symmetrically about the center of mass of the PC, so that the PC may be unloaded from above the ground to land on its base, deposited horizontally and right-side up, that is, the container remains oriented substantially symmetrically about a vertical plane, for example, even when it is lowered from the air by a helicopter.

It is still another specific object of this invention to provide a process for delivering no more than 20 gpm of reverse osmosis permeate comprising, providing a PC no larger than an ISO container constructed to accommodate, fixedly disposed therein, all equipment including instrumentation to control operation thereof; filtering brackish water through a combination of a coarse screen filter having openings of 200 μm, and a fine filter having openings no larger than 100 μm to produce filtered water, automatically back-flushing the coarse filter when it is sufficiently fouled to provide an unacceptably high pressure drop, flowing the filtered water through at least one pass of RO modules, recovering the RO permeate, and storing a portion of RO concentrate under elevated pressure above that required to back-flush the coarse filter, the amount of concentrate stored being sufficient to back-flush the coarse filter; and, periodically, the frequency depending upon the quality of brackish water, replacing the fine filter means, "on the fly" without interrupting production of permeate.

It is a further specific object of this invention to provide a process for cleaning a fouled reverse osmosis membrane used in either a first pass operation or a second pass operation of a RO subsystem in an air-deliverable reverse osmosis purification unit, comprising, diverting permeate to a cleaning tank, adding appropriate chemicals to diverted permeate in the tank to form a cleaning solution, flowing the cleaning solution to the suction side of the booster pump, and diverting the discharge of cleaning solution to the fouled membrane to be cleaned.

BRIEF DESCRIPTION OF THE DRAWINGS

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

In a scale-up of the prior 600 gals/hr ROWPU to 3000 gals/hr, also described in the aforementioned brochure by Bagwell, Jr., cyclone separators were suggested prior to flowing raw water to basket filters, followed by a multimedia filter and cartridge filters. A coagulant and a scale inhibitor were injected into the raw water supply pumped to the multi-media filter. In either version of the process it was not possible to clean either the filters or the RO elements in place. A double pass operation required storing, then reusing the permeate from the first pass.

Figure 1:
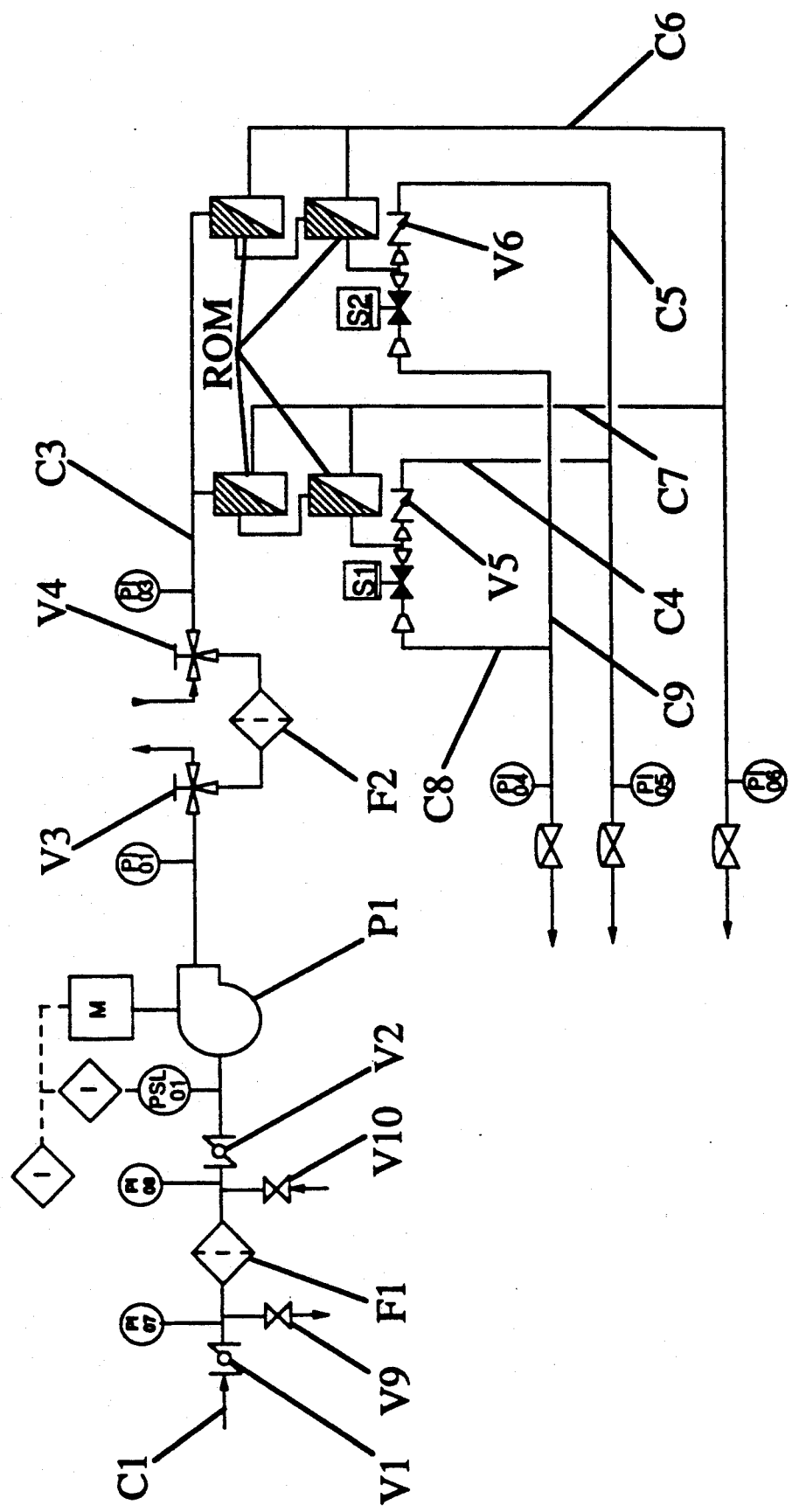
FIG. 1 is a diagrammatic illustration of an embodiment of a prior ROWPU unit disclosed in a U.S. Army brochure, for producing RO water from brackish water using a RO subsystem, in addition to other means required, referred to hereinabove, which unit was modified in a ADROWPU unit disclosed in the Canadian publication UBIQUE, for a double pass operation.

An embodiment of a prior art unit in which the high pressure process pump is also used either to flush a RO module periodically, or, to deliver cleaning solution to clean a RO module when it becomes fouled, is schematically illustrated in the flow diagram in FIG. 1. This unit avoided the use of coagulant, rust inhibitor and citric acid, and permitted back-washing the coarse filter, as the necessity arose. However, the wash water had to be stored in a tank from which it had to be pumped through the filters; and, though a self-contained cleaning system including a cleaning pump to clean the RO modules was avoided, the operation of the process pump had to be interrupted to change over to the cleaning cycle.

Referring in greater detail to the system shown in FIG. 1 it is seen that raw water is delivered from a feed pump (not shown) through a conduit (or "line") C1, and butterfly valve V1 to a coarse (20 U.S. Standard mesh) filter F1 where relatively large solids are removed. The filtered raw water flows through butterfly valve V2 to the suction of a process pump P1. The discharge of the pump P1 through line C2 is flowed through three-way valve V3 in line C3, through a 100 $\mu$m "fine" filter F2, then through another three-way valve V4, to two banks of RO modules identified as "ROM" connected in parallel. Each bank consists of two ROMs connected in series, the concentrate from the first module being fed to the second module. The concentrates and permeates from each bank are combined.

The concentrate from the two banks is flowed through check valves V5 and V6, into lines C4 and C5 respectively, the rates of flow from which are combined before being discharged at a concentrate outlet. The permeate from the two banks is flowed through lines C6 and C7, the rates of flow from which are combined before being discharged at a permeate outlet which is led to storage.

At preset intervals of time, the ROMs are flushed by opening solenoid valves S1 and S2 for a short period of time. The flow from flushing is carried away by lines C8 and C9 respectively, the rates of flow from which are combined before being discharged at a flush outlet. For cleaning, the suction of the pump is placed in flow communication with the solution in a cleaning tank (not shown), the cartridge filters are removed, and the cleaning solution recirculated through a RO module to be cleaned (the cleaning loop to the cleaning tank is not shown).

The foregoing unit which was conventionally constructed relied upon an outside source of water for back-washing the coarse filter F1 and the fine filter F2. As shown in FIG. 1, cleaning the filter F1 was done periodically by shutting down the unit, and connecting the valves V9 and V10 to the source of wash water. In an analogous manner, F2 was washed by connecting valves V3 and V4 to the source of wash water. Pressure indicating gauges identified as PI (nos. 01, 03, 04, 05, 06, 07 an 08) monitor the pressure conditions in the respective lines, and low pressure sensing switch PSL01 protects the process pump.

The above system was modified in the ADROWPU referred to in the Canadian publication, in a conventional manner to allow for removal of permeate from single pass operation. In actual operation the filters unit, particularly the coarse filter, plugged too frequently, requiring frequent washing with clean water. For reasons given herebelow, there was no reason to store concentrate to wash the filter.

Figure 2:
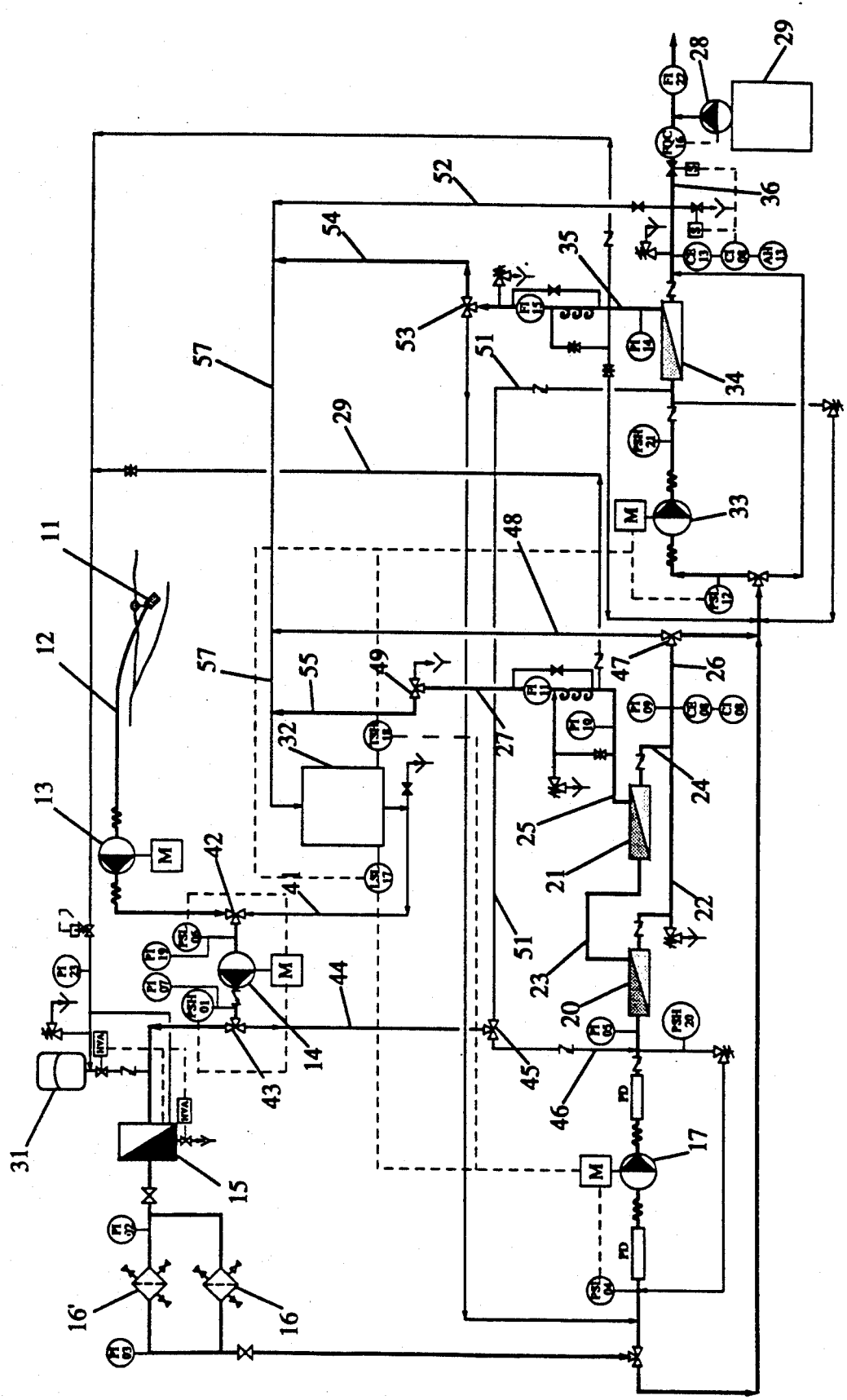
FIG. 2 is a process flowsheet of items of equipment in a two-compartment purification container ("PC") of this invention, in selectively valved fluid connection with plural RO modules which may be operated in either single pass, or double pass operation.

Referring to FIG. 2, there is schematically illustrated the piping and instrumentation diagram for components mounted in the PC of this invention which is tailored for use to meet specific demands dictated by the ability to transport the PC to a site where the only source water available is contaminated "raw" water, and potable water is required. The PC is specifically designed to be loaded onto a truck with a standard pelletized loading system ("PLS") carried on a 10 ton Steyrtruck (Nato Stock #NSN2320-21-901-6002 ECC 126815), referred to herein as a "standard loading means".

Source water, typically brackish water or sea water, is drawn through a strainer 11 on a suction hose 12 by a feed pump 13. The feed pump is preferably a self-priming stainless steel, close-coupled pump with a 2 HP totally enclosed tropicalized motor capable of delivering 40 gpm at 60 ft total discharge head ("TDH"). The water is pumped from pump 13 to a booster pump 14 where the water is further pressurized, raising the pressure by an additional 50 psi, to add in the range from 40–60 psig, sufficient to flow first through a self-cleaning filter 15 which contains a coarse 200 $\mu$m (micrometers, or microns) screen and a fine 50 $\mu$m screen to remove relatively large suspended solids, then through a pair of 5–15 $\mu$m postfilter cartridges 16 and 16' to remove smaller suspended solids which would damage RO membranes in RO vessels 20 and 21 connected in series.

The filter 15 is preferably a commercially available Filtomat filter having inlet, outlet and drain connections. Most preferred is a Filtomat Model M302L which comprises a cylindrical housing within which cylindrical screens are concentrically disposed in spaced apart relationship to the housing's inner surface. Typically a coarse screen (150 $\mu$m) is disposed above a fine (50 $\mu$m) screen. A dirt scavenger and a hydraulic motor are centrally disposed within the housing so that upon rotation of the scavenger, the inner surfaces of the screens are cleaned. A rinse valve, and a rinse control unit with a pressure-drop switch, are exteriorly disposed relative to the housing. When the pressure drop across the fine screen reaches a preset level, say about 7 psi, the rinse control unit actuates the rinse valve opening it to a drain. Since the drain is at atmospheric pressure, a low pressure path is created through the hydraulic motor and the dirt scavenger, and the filter enters a self-cleaning mode. The drain valve as well as a valve which releases water from the bladder tank open, and the cleaning cycle begins, utilizing high flow and high pressure and lasting about 3 to 5 seconds. This low pressure in effect "vacuums" the dirt from the screen at a slot in the dirt scavenger, and sends the dirt through the dirt scavenger, the hydraulic motor and the rinse valve to the drain. Flow of the water out of the unit causes the hydraulic motor to spin the dirt scavenger. As the screen is cleaned the pressure drop decreases and when essentially zero, the pressure-drop switch closes the rinse valve. The rinse cycle last about 5 secs and uses about 12 gal of water without interrupting the flow. When the cleaning cycle is complete, the drain valve and the bladder tank are automatically closed and the bladder tank is recharged for the next cleaning.

Because the high flow rate, namely 110 gpm, is required for no more than 5 secs, only about 17 gal from the bladder tank is required for discharge, though keeping 20 gal is preferred. The two design features, namely, the storage of flushing water at over 95 psig in a bladder tank, and, the short duration over which a high flow rate is required, make it possible for the Filtomat to be uniquely adapted for service in the ADROWPU.

As an added benefit, the required energy stored for flushing is derived from high pressure concentrate which is readily available because of the process pump, and this concentrate would have been discharged to drain in normal operation. In other words, the energy for storing the flushing water, as well as the flushing water itself, are each obtained at no additional cost.

The postfilter cartridges 16 and 16' are each stainless steel housings that hold four 30" long 5 $\mu$m cartridges. When the pressure drop across them exceeds 5 psi over that for freshly installed cartridges, the used cartridges are replaced.

Essentially solids-free water enters a first high pressure pump 17 (first pass pump) and is pumped at a pressure in the range from about 600–650 psig, first to RO vessel 20 where the water is separated into a first permeate stream 22 and a first concentrate stream 23. The first concentrate stream 23 is flowed to second RO vessel 21 and is again separated into a second permeate stream 24 and a second concentrate stream 25. Each RO vessel 20 and 21 is most preferably fitted with 2 "sea-water" membranes.

The first and second permeate streams 22 and 24 are of essentially identical purity, and are combined in stream 26. Unless the source water is exceedingly contaminated this stream 26 after chlorination with a controlled injection of chlorine is potable, and is sent to storage outside the PC. The chlorine is injected with a chlorine injection pump 28, from a chlorine tank 29. In a single pass operation, with a feed water flow rate of 40 gpm, about 20 gpm of permeate is produced, the ratio of source water to permeate being 2/1. This ratio is at least 3 times higher than was possible with a prior art unit, irrespective of the great mismatch in overall size of the transportable units used. Typically, when the double pass mode is used, the second pass remains substantially less fouled than the first. Accordingly, the second pass is cleaned first, and the cleaning solution is reused to clean the first pass.

A portion of second concentrate stream 25 is flowed through conduit 29 to bladder tank 31; and, a portion is flowed through conduit 27 to drain. The pressure in the bladder tank 31 may be up to 95 psig so as not to damage the coarse filter. Such a filter may be effectively back-flushed with as little as 120 gpm at 100 psig. It will be appreciated, that to back-flush a coarse screen filter effectively the flow of flushing fluid is preferably in a highly turbulent state, or, in "plug flow" as it enters the filter 15.

When the source water is exceedingly contaminated, the PC is used in its double pass operating mode. In this mode, the combined first pass permeate stream 26 is flowed to the suction of a second high pressure pump (second pass pump) 33 operating in the pressure range from about 500–600 psig, and fed to a single second pass RO vessel 34 containing 2 spiral wound membranes, most preferably "sea-water" membranes. The stream 26 is separated into a third permeate stream (second pass permeate) 36 and a third concentrate stream (second pass concentrate) 35. The permeate stream 36, as before is chlorinated and stored in a potable water tank.

The concentrate stream 35 may be returned to the suction of the first high pressure pump 17, or to the second high pressure pump 33, depending upon the level of contaminants in the concentrate stream 35.

Since the high pressure pump for the first pass is for twice the flow rate as the second pass pump, the first pass pump is driven with a motor twice the power of the motor driving the second pass pump. Preferably FMC triplex plunger pumps are used, the first pass pump being fitted with a 20 HP 1750 rpm TEFC tropicalized motor to deliver 40 gpm, and the second pass pump fitted with a 10 HP 1750 rpm TEFC tropicalized motor to deliver 20 gpm.

When the first pass RO modules are fouled sufficiently to require chemical cleaning, before the pumps are shut off, the permeate is diverted to fill the c-i-p tank through conduit 48 if the first pass is used, and 52 if the second pass is used. The cleaning cycle is commenced by drawing cleaning solution from the tank 32 through line 41 and the appropriate valve means 42 to the suction side of the booster pump 14. The discharge of the pump is diverted through valve means 43 into line 44, and through valve means 45 into line 46.

The chemical cleaning solution is thus flowed through the first pass modules. The permeate portion of the cleaning solution flows through lines 22 and 24 then through valve means 47 into line 48 and is returned, through line 51 to the clean-in-place tank 32. The concentrate portion of the cleaning solution is flowed through lines 23, 25, 27 and valve means 49 to line 55 then line 57, and is thus returned to the tank 32. Circulation of the cleaning solution is continued until the RO membranes in the modules are deemed to be adequately clean. When recirculation of the cleaning solution is no longer desired, the solution is diverted by valve 49 to drain.

Typically the second pass RO module is not as frequently fouled as the first pass modules. When the second pass module is fouled, it is cleaned, after the unit is shut down, as before, by itself, that is, without at the same time cleaning the first pass modules, so that the condition of the second pass RO module, after cleaning, can be accurately determined.

To clean the second pass RO module 34, the discharge of cleaning solution from the booster pump is led through line 44 and valve means 45 into line 51 and into the RO module 34. The permeate from the module 34 flows through line 36, then 52, and is returned to the tank 32 through line 57. The concentrate from the module 34 flows through line 35, valve means 53, line 54 and then through line 57 into the tank 32. As before, the cleaning solution is circulated through the closed-loop system until the RO module 34 is deemed to be sufficiently cleaned. The cleaning solution is then used to clean the first pass module.

The requirement of high pressure delivered by the high pressure pump is required because an RO membrane is semi-permeable and requires the aqueous feed to be pumped to it at a pressure above the osmotic pressure of the dissolved substances in the water. Because an RO membrane can effectively remove low mol wt molecules <150 Daltons, and also ions from water, RO membranes are commonly used to demineralize water (e.g. for pretreating boiler feedwater, and recovering potable water from brackish water or sea water).

The following RO membranes provide good service: Filmtec BW-30; Filmtec SW-30; Filmtec SW-30HR UOP RO membrane Desal RO membrane Osmonics RO membrane Nitto RO membrane.

In the aforementioned description of the process flow, details of the valve means, whether check valves, three-way valves, or two-way valves, are not given, but they are shown on the flowsheet, along with pulsation dampeners, drains, and instrumentation, to provide a more detailed description of the piping and instrumentation used in the system.

In the drawing, the code for the reference characters used in the drawing is as follows:

| | |
|---|---|
| AH | alarm high |
| CE | conductivity element |
| FI | flow indicator |
| FQC | flow totalling controller |
| I | interlock (electrical) |
| M | motor |
| PD | pulsation dampener |
| PI | pressure indicator |
| PSL | pressure switch low |
| S | solenoid |
| PRV | pressure regulating valve |
| HVA | hydraulic valve assembly |

Conductivity indicators, such as a Thorton conductivity meter, measure the level of contaminants in the streams. The meter is a dual channel meter which can monitor and display both first and second pass water quality. The meter is preferably located on the RO instrumentation panel.

All electrical power to the PC is supplied by a single diesel generator, and all operations are controlled with a programmable logic controller. The output of the generator is 208 volts, 3 phase, 60 Hz. A preferred generator is powered by a Deutz air-cooled four cylinder turbo diesel engine and the alternator is a 40 kw Stamford alternator.

Since the ADROWPU is to operate without freeze-up at an ambient temperature as low as −40° C., air which is heated by ducting it over the hot cooling fins of the air-cooled diesel engine is used to heat the RO compartment. The heated air is ducted through a dividing wall which separates the RO compartment from the generator compartment. During warm weather, the heated air is ducted to the outside environment.

It will now be evident that the self-contained, transportable ADROWPU of this invention comprises plural essential components in combination and in operable fluid relationship with one and another. The ADROWPU comprises, an enclosed weather-tight housing having a continuous rectangular base integrally combined with the housing to form a purification container having the overall dimensions of an ISO container, the purification container being adapted to be demountably disposed in a transport means from which the purification container may be deployed without due care, to land on the ground with the base in a horizontal position, and the container right-side-up; an A-frame integrally combined with the base, each including attachment means for deploying the container; hydrocarbon fuel-powered generating means for generating sufficient electricity at a voltage required to operate all components powered by electricity, and storage means for storing enough fuel to operate the generating means for a predetermined period of time; the housing being divided into first and second enclosed compartments separated from one another by a dividing wall, the second compartment having the fuel storage means, and the generating means including electrical control means therefor and a storage battery, housed in the second compartment; the first compartment having housed therein substantially all remaining components for purifying raw contaminated water, the components including, a first pass reverse osmosis module and a second pass reverse osmosis module; a feed pump, a booster pump, first pass and second pass process pumps, and a chlorine injection pump; first pass and second pass reverse osmosis modules having reverse osmosis elements disposed therein; coarse filter means and fine filter means; a bladder tank having a capacity of at least 17 gal, preferably no more than 50 gal; a "clean-in-place" cleaning tank having a capacity of at least 30 gal, preferably no more than 50 gal; and, control means to operate said components to deliver no more than 20 gpm of permeate in a single pass operation; the first and second compartments having equipment therein demountably secured to the base and interior surfaces of the compartments with shock-absorbing means, the equipment being essentially symmetrically distributed about the center of mass of the container, whereby the container may be unloaded from above the ground and land thereon, base first, and the container remain oriented in a substantially vertical position.

The positioning of the various items of equipment so as to meet the critical spatial requirement of an ISO unit, yet be substantially symmetrically disposed about the center of mass of the PC, will be better appreciated by reference to the FIGS. 3-8.

Figure 3:
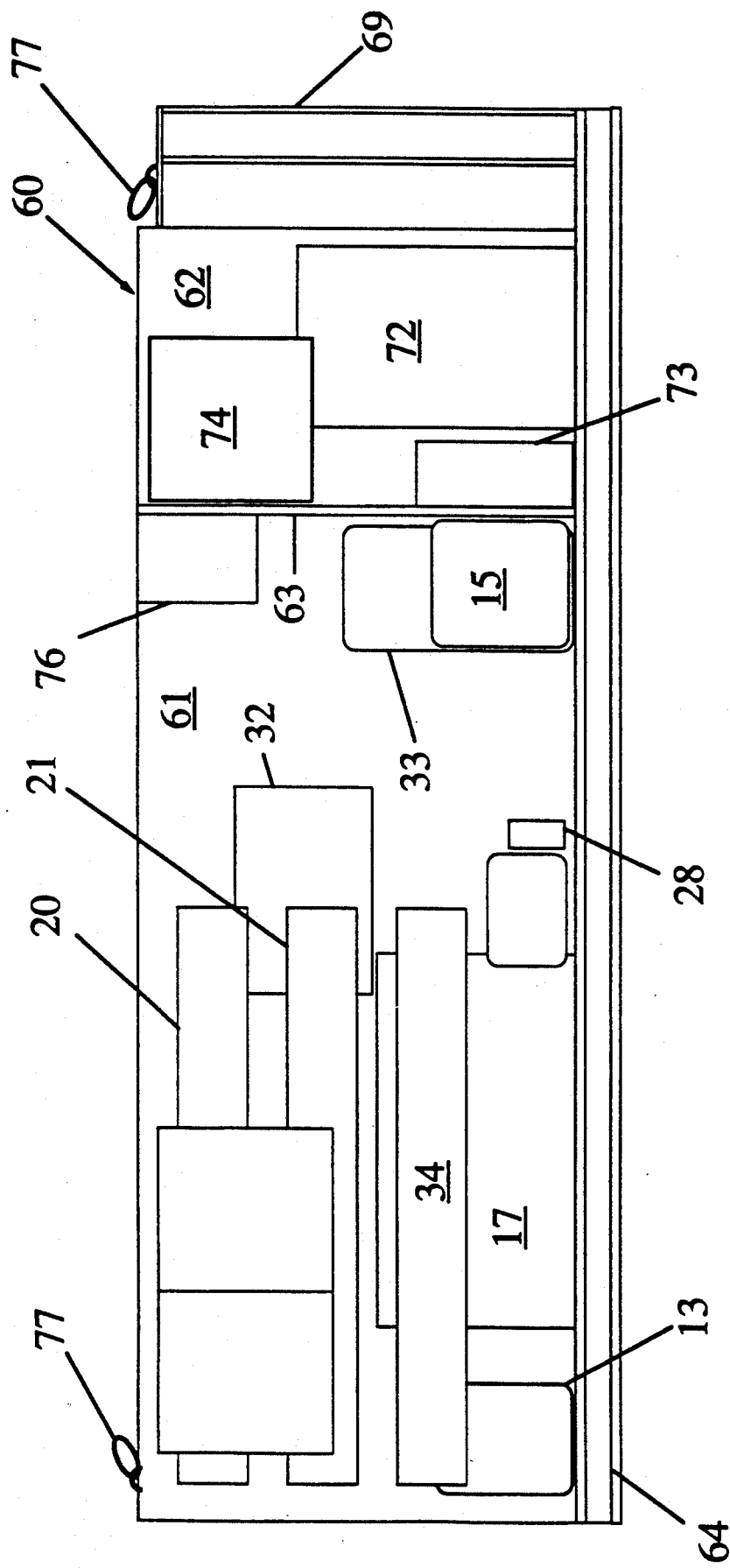
FIG. 3 is a side elevational view of the PC, schematically illustrating the positioning of the various items of equipment so that all items are contained within the PC.

Referring first to FIG. 3, there is schematically shown an elevational side view of the ADROWPU indicated generally by reference numeral 60 comprising a housing including first and second fully enclosed compartments 61 and 62, referred to as the 'RO compartment' and the 'generator compartment' respectively, separated by a dividing wall 63. Access to the compartment 61 is provided by doors 61' (FIG. 4) in the side- and end walls; and the compartment 62 may be opened to the atmosphere by opening doors (not shown) in the side-walls. The housing has a rectangular base 64, longer than it is wide, to match the requirements of an ISO container, and the side-walls 65 and 65' (FIG. 7), and common floor 66 of compartments 61 and 62 are continuous and integrally constructed for maximum strength. The floor 66 is supported on four I-beams 67 provided with tie-down rings 68 or other attachment means for lifting the ADROWPU. At least the walls and ceiling of the RO compartment are insulated for protection against sub-freezing weather.

One end (front) of the base 64 is provided with an A-frame 69 which provides means for lifting the ADROWPU onto the aforesaid truck. The A-frame is also provided with lifting rings (not shown) similar to those (68) shown in FIG. 7.

Figure 4:
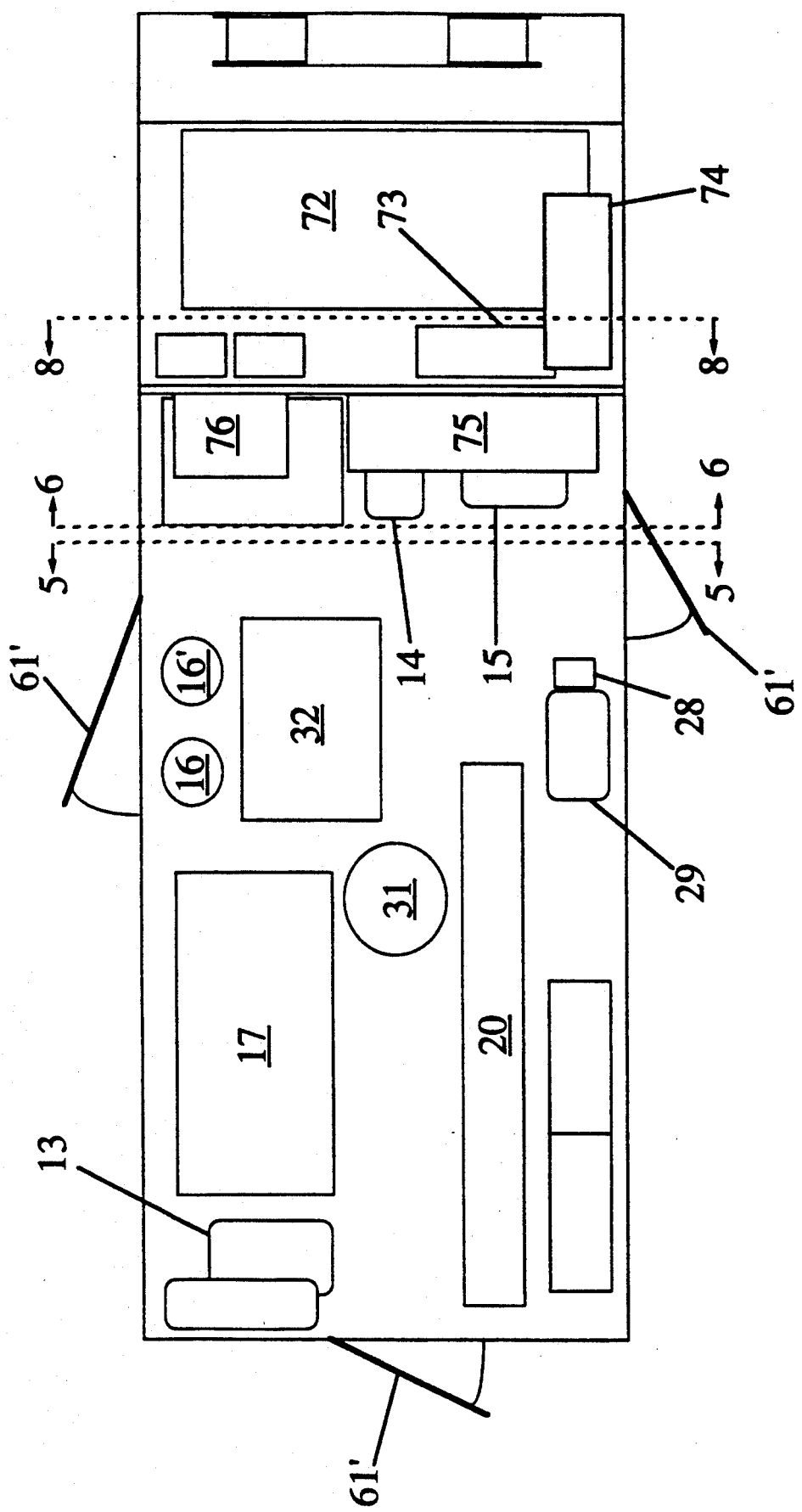
FIG. 4 is a top plan view of the PC to illustrate the accessibility of the items of equipment despite their closely interconnected configuration.

Referring now to compartment 61, and specifically to FIGS. 3 and 4, it is seen that the pumps are mounted on the floor. Each of the pumps, the feed pump 13, the booster pump 14, the first pass pump 17, the second pass pump 33, and the chlorine injection pump 28, is floor-mounted on shock-absorber means (not shown). The particular shock absorber means used is not narrowly critical provided it will absorb the shocks to which the ROWPU is likely to be subjected, without damage to the equipment.

Also floor-mounted on shock absorber means are the following: the chlorine tank 29; the bladder tank 31; the Filtomat coarse filter 15, and the fine prefilters 16 and 16'. A power distribution panel 75 and a heater 76 are suspended from the ceiling against the inner surface of the dividing wall 63.

In compartment 62, the diesel generator 72 is floor-mounted on shock absorbing means, and a diesel control panel 74 is suspended from the ceiling.

It will now be evident that the weight of the components is distributed in each of the compartments with the specific purpose of maintaining the center of mass of the ADROWPU at the intersection of the diagonals drawn from the four corners of the base of the housing 60. This requirement of substantial symmetry is critical to provide ease of transportability and deployment of the ADROWPU.

Figure 5:
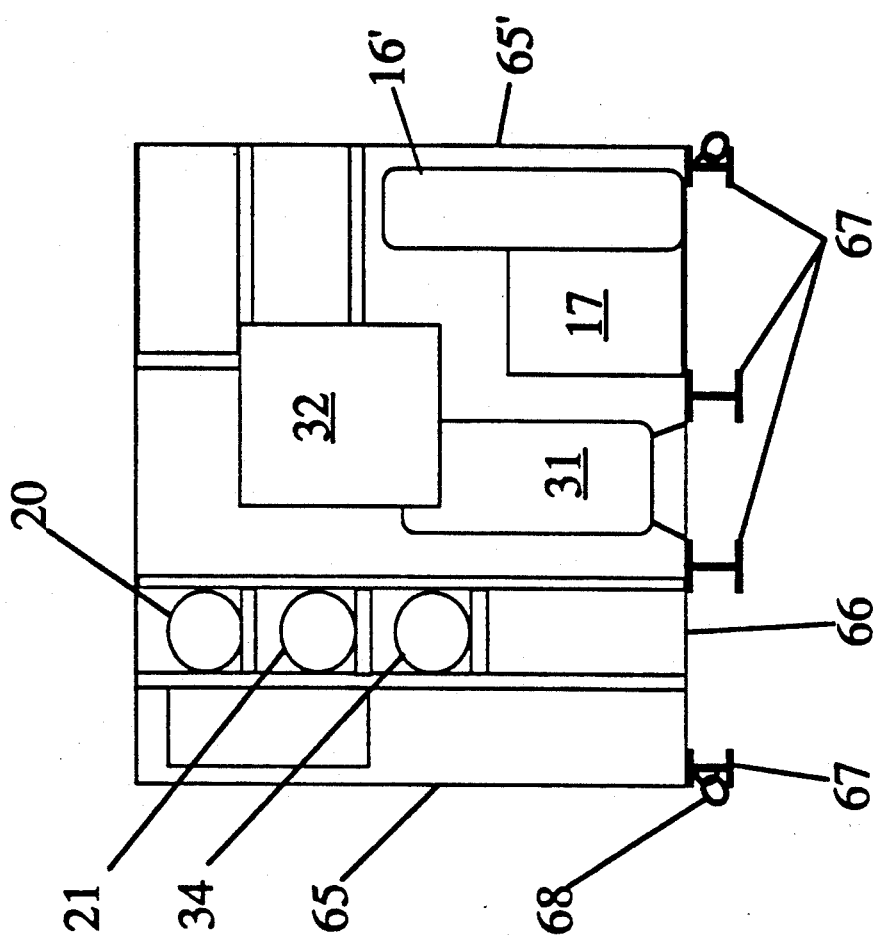
FIG. 5 is an end elevational view looking towards the rear of the PC in the direction 5—5, showing the positioning of the RO vessels and chemical cleaning tank.

Referring to FIG. 5 there is schematically shown an end elevational view along section 6—6 looking towards the rear of the compartment 61, showing the elevational relationship of the modules, the chlorine tank 29, and the clean-in-place tank 32.

Figure 6:
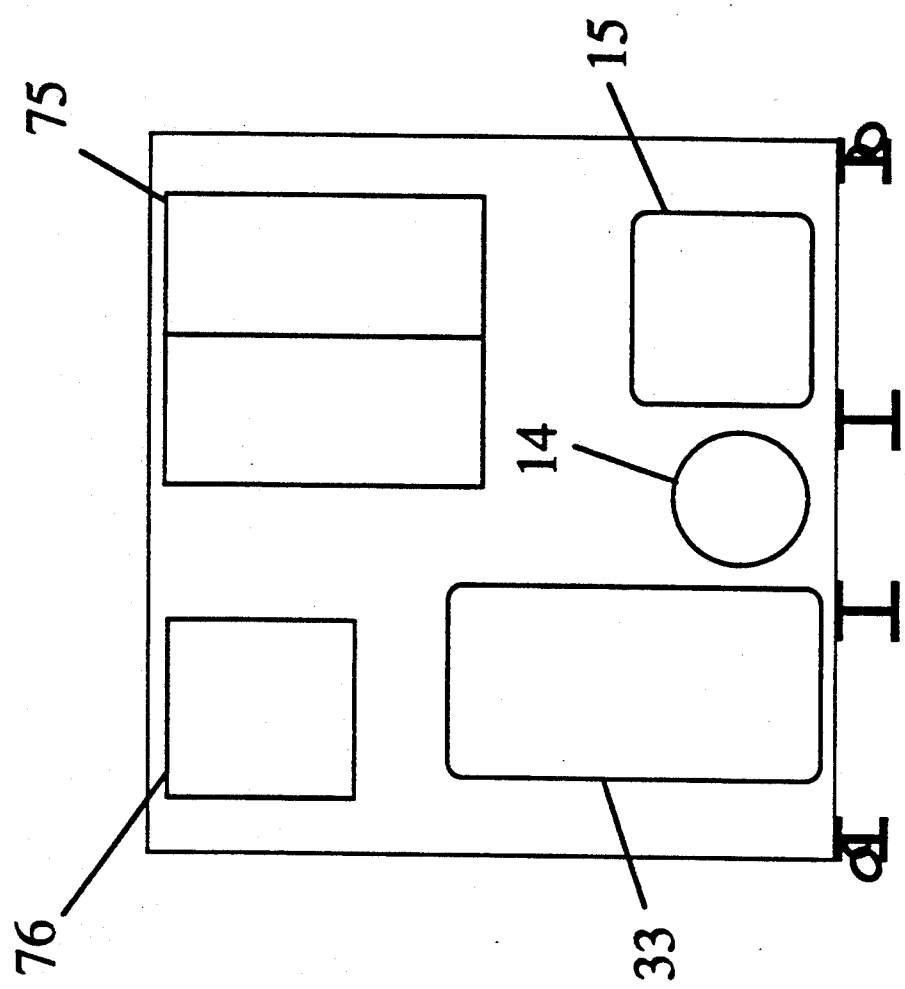
FIG. 6 is an end elevational view looking towards the front of the PC in the direction 6—6, showing the positioning of the second pass pump.

Referring to FIG. 6 is an end elevational view along the section 7—7 schematically illustrating the positioning of the components adjacent the dividing wall 63 at the front of the compartment 61.

Figure 7:
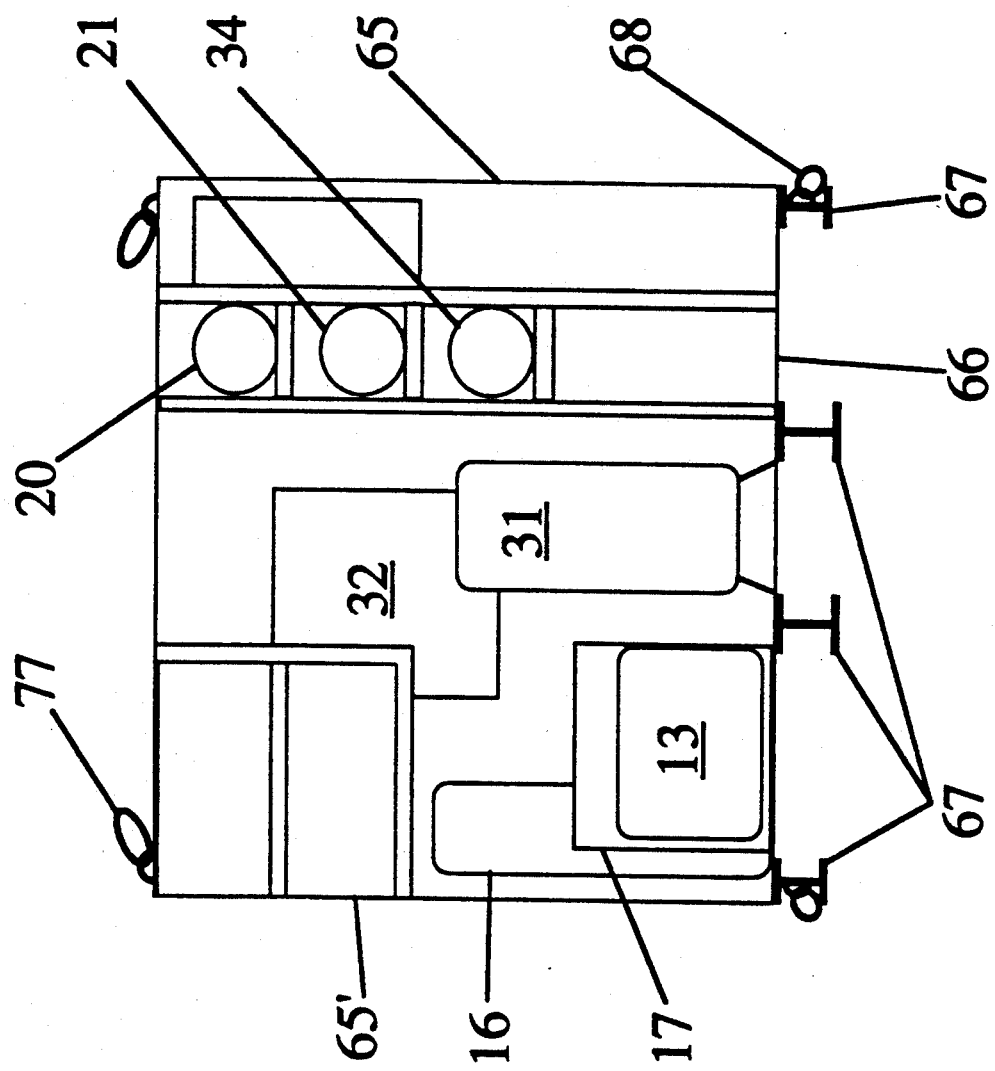
FIG. 7 is a rear end elevational view looking towards the front of the PC, showing the positioning of the RO vessels and the first pass process pump.

As indicated in the schematic end elevational view shown in FIG. 7, the RO modules are stacked in vertical spaced apart relationship, the two first pass modules 20 and 21 above the second pass module 34. The control panel and instrument panel are mounted adjacent one side-wall for ease of accessibility, preferably by suspending them from the ceiling of the compartment with appropriate shock-absorbing means.

Figure 8:
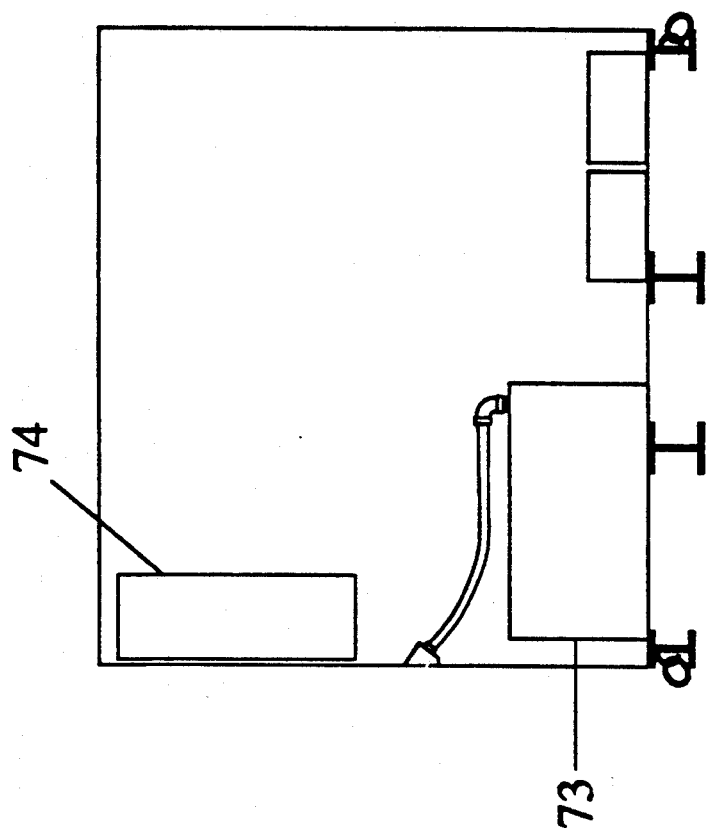
FIG. 8 is an elevational view looking towards the rear of the PC in the direction 8—8, showing the positioning of the fuel tank outside the main chamber of the PC.

Referring to FIG. 8 there is shown a detail of the fuel tank 73 mounted outside the compartment 61, directly to the floor 66. Mounting the fuel tank in compartment 62 adjacent the generator provides for safety, convenient flow of fuel to the generator, as well as proper distribution of weight.

Having thus provided a general discussion, and specific illustrations of the best mode of constructing a purification container to provide a specific design quantity of permeate under essentially any conditions locate adjacent any contaminated source of water, all equipment being packaged within the confines of an ISO container, or equivalent thereof, and having described how the novel ADROWPU's programmed operation allows an unskilled person to use it, it is to be understood that no undue restrictions are to be imposed by reason thereof except as provided by the following claims.

We claim:

1. A self-contained, transportable reverse osmosis water purification unit having a throughput of no more than about 20 gpm of permeate in a single pass operation, said unit comprising, an enclosed weather-tight housing having a continuous base integrally combined with said housing to form a purification container having the overall dimensions of an ISO container, said purification container 5.5 m long×2.1 m wide×1.7 m high being adapted to be demountably disposed in a transport means from which said purification container may be deployed without due care, to land on the ground in a horizontal position, right-side-up;

an A-frame integrally combined with said base, each including attachment means for deploying said container;

hydrocarbon fuel-powered generating means for generating sufficient electricity at a voltage required to operate all components powered by electricity, and storage means for storing enough fuel to operate said generating means for a predetermined period of time;

said housing being divided into first and second enclosed compartments separated from one another by a dividing wall, said second compartment having said fuel storage means, and said generating means including electrical control means therefor and a storage battery, housed in said second compartment;

said first compartment having housed therein substantially all remaining components for purifying raw contaminated water, said components including, a first pass reverse osmosis module and a second pass reverse osmosis module; a feed pump, a booster pump, first pass and second pass process pumps, and a chlorine injection pump; first pass and second pass reverse osmosis modules having reverse osmosis elements disposed therein; coarse filter means and fine filter means; a bladder tank having a capacity of at least 17 gal; a cleaning tank having a capacity of at least 30 gal; and, control means to operate said components to deliver no more than 20 gpm of permeate in a single pass operation;

said first and second compartments having equipment therein demountably secured to said base and interior surfaces of said compartments with shock-absorbing means, said equipment being essentially symmetrically distributed about the center of mass of said container, whereby said container may be unloaded from a supporting surface above the ground and land thereon, base first, and remain oriented in a substantially vertical position.

2. The purification unit of claim 1 wherein said coarse filter means includes automatic self-cleaning means adapted to back-wash said coarse filter means without interruption of flow of raw water to said fine filter means, and without utilizing a source of water other than stored concentrate.

3. The purification unit of claim 2 wherein said first pass module comprises plural modules connected in series, so as to flow concentrate from the first as feed to the second, the permeates and concentrates from said plural modules being respectively combined; and, said second pass comprises a single second pass module connected in selective permeate-flow-communication with said first pass modules so as to flow said permeates as feed to said second pass module.

4. The purification unit of claim 3 wherein said self-cleaning means is in selective fluid communication with concentrate stored in said bladder tank, and said concentrate is pumplessly delivered to said self-cleaning means.

5. The purification unit of claim 4 including conduit and valving means to chemically clean said first pass modules and said second pass module, separately, without removing said reverse osmosis elements from within said modules, and without utilizing a source of water other than permeate.

6. The purification unit of claim 1 wherein said fine filter comprises a combination of a 50 $\mu$m screen filter disposed upstream plural 5 $\mu$m–15 $\mu$m cartridge filters.

7. A process for delivering no more than 20 gpm of permeate from reverse osmosis modules housed in a transportable container constructed to have fixedly disposed therein all equipment including instrumentation to control operation thereof, said process comprising, providing a purification container no larger than an ISO container 5.5m long × 2.1 m wide × 1.7 m high filtering brackish water through a combination of a coarse screen filter having openings no larger than 300 $\mu$m, and a fine filter having openings no larger than 100 $\mu$m to produce filtered water; automatically back-flushing said coarse filter when it is sufficiently fouled to provide a pressure drop sufficiently high to indicate an unacceptable constriction of flow; flowing said filtered water through at least one pass of reverse osmosis modules; recovering said permeate; and, storing a portion of concentrate from at least one of said reverse osmosis modules, under elevated pressure above that required to back-flush said coarse filter, the amount of concentrate stored being sufficient to back-flush said coarse filter; and, periodically replacing said fine filter means without interrupting production of permeate.

8. A process for cleaning a fouled reverse osmosis membrane used in either a first pass operation or a second pass operation of a reverse osmosis subsystem in an air deliverable reverse osmosis purification unit, comprising, diverting permeate to a cleaning tank in which no permeate is stored to be made up into a chemical cleaning solution; adding appropriate chemicals to diverted permeate in the tank to form said cleaning solution; flowing said cleaning solution to the suction side of a booster pump used to pump incoming water into filters prior to being introduced into said unit; and, diverting said cleaning solution discharged by said booster pump to a fouled membrane to be cleaned.

* * * * *